(12) United States Patent
Ishikawa et al.

(10) Patent No.: US 12,704,193 B2
(45) Date of Patent: Aug. 11, 2026

(54) FLUID FLOW VALVE AND METHODS OF OPERATING THEREOF

(71) Applicant: Applied Materials, Inc., Santa Clara, CA (US)

(72) Inventors: David Ishikawa, Mountain View, CA (US); Sumedh Dattatraya Acharya, Karnataka (IN); Arun Nagarajan, Georgetown, TX (US); Ming Xu, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 91 days.

(21) Appl. No.: 18/372,804

(22) Filed: Sep. 26, 2023

(65) Prior Publication Data

US 2025/0102072 A1 Mar. 27, 2025

(51) Int. Cl.

| | |
|---|---|
| ***F16K 27/02*** | (2006.01) |
| ***F16K 7/14*** | (2006.01) |
| *F16K 31/00* | (2006.01) |
| *F16K 47/08* | (2006.01) |

(52) U.S. Cl.

CPC ............ *F16K 27/0236* (2013.01); *F16K 7/14* (2013.01); *F16K 31/005* (2013.01); *F16K 47/08* (2013.01)

(58) Field of Classification Search

CPC ..... F16K 7/14; F16K 7/16; F16K 7/17; F16K 27/0236; F16K 47/08; F16K 31/004; F16K 31/005; F16K 1/526; F16K 11/022

See application file for complete search history.

(56) References Cited

U.S. PATENT DOCUMENTS

| | | | | |
|---|---|---|---|---|
| 2,758,609 A * | 8/1956 | Dickert | F16K 15/144 | 137/859 |
| 3,822,720 A * | 7/1974 | Souza | F16K 15/1401 | 417/478 |
| 4,617,952 A * | 10/1986 | Fujiwara | F15B 5/003 | 137/625.45 |
| 4,729,401 A * | 3/1988 | Raines | F16K 15/148 | 604/246 |

(Continued)

FOREIGN PATENT DOCUMENTS

| | | |
|---|---|---|
| CN | 113028117 A | 6/2021 |
| EP | 3670980 A1 | 6/2020 |

(Continued)

OTHER PUBLICATIONS

Machine English translation of WO-2016013172-A1 (Year: 2025).*

(Continued)

*Primary Examiner* — Hailey K. Do

(74) *Attorney, Agent, or Firm* — Lowenstein Sandler LLP

(57) ABSTRACT

Certain embodiments of the present disclosure relate to a fluid flow valve. The fluid flow valve includes a housing configured to receive a flow of fluid. The fluid flow valve further includes a first valve portion configured to proportionally control the flow of fluid through the housing. The fluid flow valve further includes a second valve portion in series with the first valve portion along a fluid flow path within the housing. The second valve portion is configured to actuate between an open position to permit the flow of fluid and a closed position to stop the flow of fluid.

19 Claims, 10 Drawing Sheets

(56) References Cited

U.S. PATENT DOCUMENTS

| | | | | | |
|---|---|---|---|---|---|
| 5,277,171 | A * | 1/1994 | Lannes | F16K 15/1401 137/854 |
| 10,801,637 | B2 * | 10/2020 | Mou | F16K 31/005 |
| 11,808,381 | B2 * | 11/2023 | Glime, III | F16K 27/0236 |
| 2012/0316492 | A1 | 12/2012 | Chappel | |
| 2018/0312279 | A1 | 11/2018 | Boyle et al. | |
| 2019/0101179 | A1 | 4/2019 | Schmidt et al. | |
| 2020/0400470 | A1 | 12/2020 | Mudd et al. | |

FOREIGN PATENT DOCUMENTS

| | | | | |
|---|---|---|---|---|
| GB | 2285672 | A * | 7/1995 | F16K 31/005 |
| KR | 20170082800 | A * | 7/2017 | F16K 11/10 |
| WO | WO-2016013172 | A1 * | 1/2016 | F16K 27/0236 |

OTHER PUBLICATIONS

Machine English translation KR_20170082800_A (Year: 2025).*

S.P. Asok, et al., "Pressure Drop Characteristics of Water Flow Through Static Annular and Triangular Cavity Labyrinth Seals," Engineering Applications of Computational Fluid Mechanics vol. 2, No. 4, pp. 482-495 (2008), 15 pages.

International Search Report and Written Opinion for International Application No. PCT/US2024/012277, mailed Jun. 19, 2024, 11 Pages.

* cited by examiner

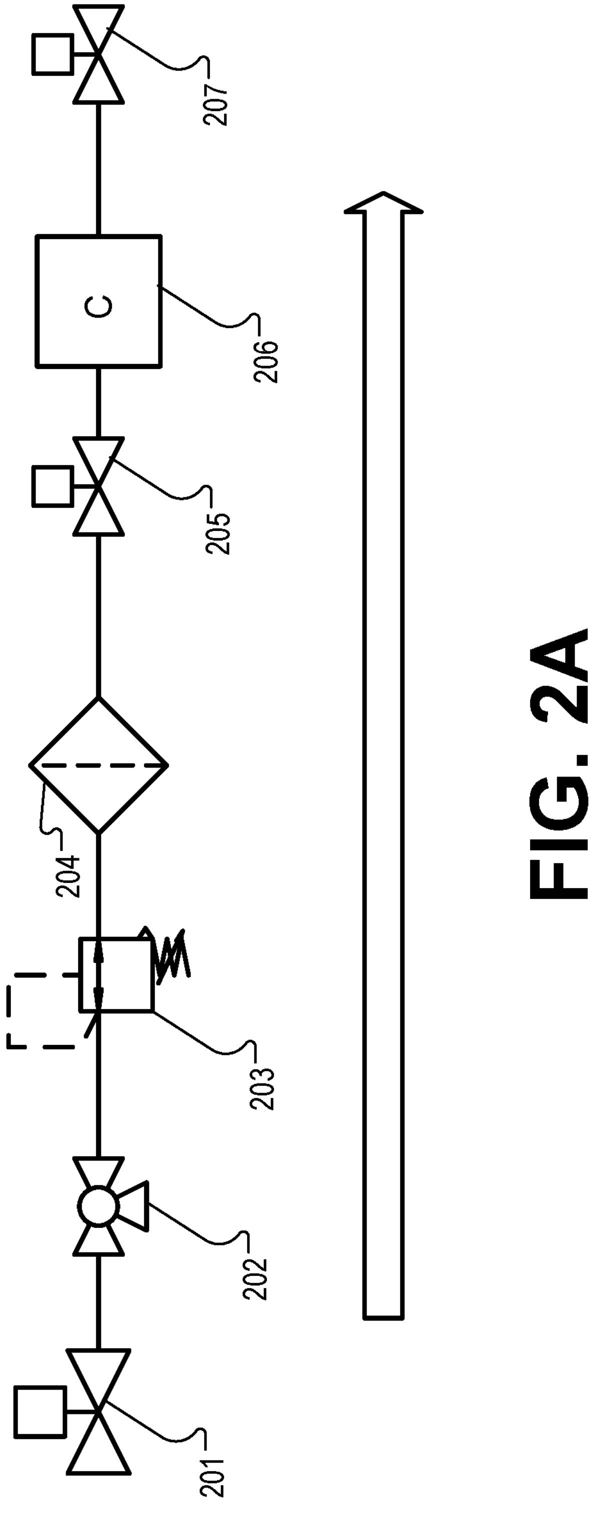
FIG. 2A
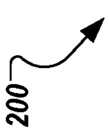

FLUID FLOW VALVE AND METHODS OF OPERATING THEREOF

TECHNICAL FIELD

Embodiments of the present disclosure relate, in general, to a valve for controlling a flow of fluid.

BACKGROUND

Various manufacturing systems (e.g., for semiconductor applications) may include fluid isolation valves to start and stop the flow of fluid to the system and fluid flow valves to proportionally control the amount of fluid flowed e.g., to a process chamber. In some manufacturing systems, process fluids (e.g., fluids used during semiconductor fabrication processes) and/or cleaning fluids (e.g., fluids used to clean a manufactured device and/or a chamber used in manufacturing an electronic device) may have precise delivery targets including high mass flow rates as well as the ability to precisely control low flow rates.

SUMMARY

Certain embodiments of the present disclosure relate to a fluid flow valve including a housing configured to receive a flow of fluid. The fluid flow valve further includes a first valve portion configured to proportionally control the flow of fluid through the housing. The fluid flow valve further includes a second valve portion in series with the first valve portion along a fluid flow path within the housing. The second valve portion is configured to actuate between an open position to permit the flow of fluid and a closed position to stop the flow of fluid.

In another aspect of the disclosure, a fluid flow system includes a valve having a housing configured to receive a flow of fluid, a first valve portion, and a second valve portion in series with the first valve portion along a fluid flow path within the housing. The fluid flow system further includes a processing device configured to cause the first valve portion to actuate to proportionally control the flow of fluid through the housing. The processing device is further configured to cause the second valve portion to actuate between an open position to permit the flow of fluid and a closed position to stop the flow of fluid.

In another aspect of the disclosure, a method includes receiving target flow data associated with a flow of fluid through a valve having a first valve portion and a second valve portion in series with the first valve portion along a fluid flow path within a housing of the valve. The method further includes causing the first valve portion to actuate to proportionally control the flow of fluid through the housing based at least in part on the target flow data. The method further includes causing the second valve portion to actuate between an open position to permit the flow of fluid and a closed position to stop the flow of fluid based at least in part on the target flow data.

BRIEF DESCRIPTION OF DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIG. 2A is a schematic diagram of a gas stick assembly in accordance with embodiments of the present disclosure.

DETAILED DESCRIPTION OF EMBODIMENTS

Figure 1:
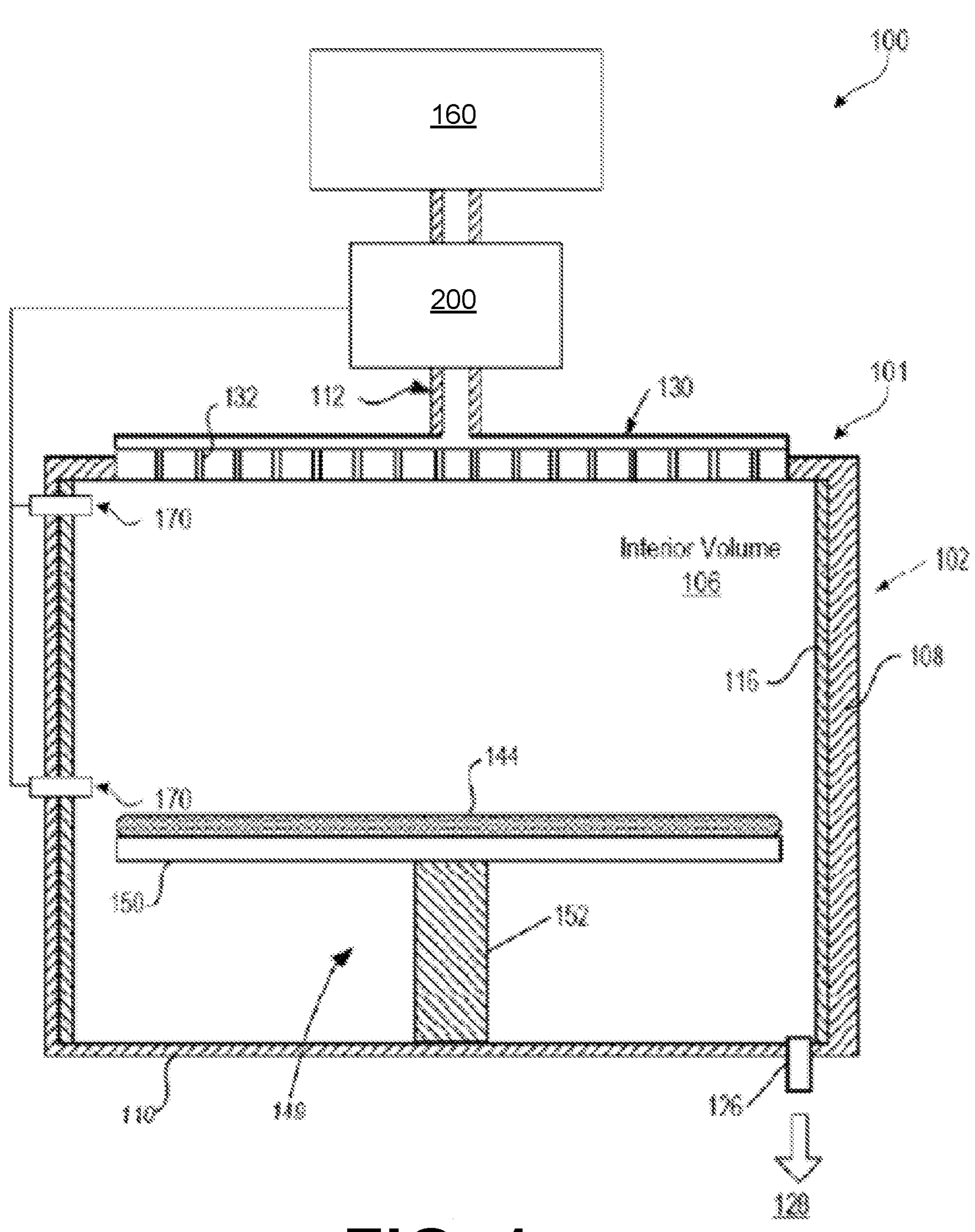
FIG. 1 illustrates an exemplary system that includes a processing chamber, a gas source, and a flow control apparatus, in accordance with embodiments of the present disclosure.

Embodiments described herein relate to a fluid flow valve (e.g., an ultra high purity (UHP) gas flow valve), a fluid flow system (e.g., a gas flow system) incorporating the same, and a method of controlling the fluid flow valve. Generally, it is advantageous to proportionally control the flow of fluid (e.g., gas) to a system such as a substrate manufacturing system. Conventional fluid distribution systems use isolation valves to stop and start the flow of a fluid (e.g., control the "on/off" of the gas flow) and an inline mass flow controller (MFC) to proportionally control the flow of fluid. In some gas distribution systems, there can be multiple isolation valves and MFCs in parallel to one another to control flow of different fluids, such as to a process chamber. However, MFCs are typically complicated and can add significant cost to the system and increased maintenance. MFCs often suffer from slow response time, which adversely affects the control of a process with short duration process recipe operations. Often, conventional MFCs are not suitable for such short duration process recipe operations because of the slow response time to adjust the flow of fluid. Another conventional solution for controlling fluid flow includes the use of flow restrictors or needle valves. Although cheaper to implement than MFCs, conventional flow restrictors or needle valves do not offer the same precision as MFCs.

Aspects and implementations of the instant disclosure address the above-described and other shortcomings of conventional fluid flow valves and systems by providing a fluid flow valve (e.g., a gas flow valve, a liquid flow valve, etc.) having an isolation control portion in series with a proportional control portion. In some embodiments, a fluid flow valve includes a housing to receive a flow of fluid (e.g., a flow of gas from a gas source, a flow of liquid, etc.). The housing may have one or more internal passages to flow the fluid along a fluid flow path within the housing. The fluid may be a process gas such as nitrogen, argon, etc. The fluid may be a corrosive gas, for example a gas used in substrate etching operations. In some embodiments, the housing includes a base portion that is to couple to a fluid flow assembly (e.g., a gas stick assembly, etc.).

In some embodiments, the fluid flow valve includes a first valve portion and a second valve portion. The first valve portion may be configured to proportionally control the flow of fluid through the housing while the second valve portion may be configured to permit the flow of fluid and stop the flow of fluid. In some embodiments, the first valve portion is configured to proportionally control the flow of fluid and permit or stop the flow of fluid. In some embodiments, the first valve portion includes a diaphragm to choke the flow of fluid through the valve. In some embodiments, the second valve portion is configured to actuate between an open position and a closed position. When in the open position, the second valve portion may permit the flow of fluid. When in the closed position, the second valve portion may stop the flow of fluid. In some embodiments, the second valve portion includes a diaphragm to stop the flow of fluid. In some embodiments, the first valve portion and the second valve portion use different portions of the same diaphragm to perform the corresponding functions. In some embodiments, a UHP valve includes a normally closed metal diaphragm isolation valve in series with a proportional flow control valve. The proportional flow control valve may include an axisymmetric fluid path with an electronically tunable cavity loss coefficient in embodiments. In embodiments, a computer-controlled input signal is provided to a piezoelectric actuator to dynamically modulate the hydraulic diameter of a fluid path and/or to dynamically modulate a cavity loss coefficient. Such dynamic modulation of the hydraulic diameter and/or the cavity loss coefficient may reproducibly decrease or increase fluid flow according to a processing recipe.

In some embodiments, the first valve portion and the second valve portion are actuated together. For example, a single actuator may cause the second valve portion to open and close, and may further cause the first valve portion to actuate to control the flow of fluid. In some embodiments, the first valve portion and the second valve portion are separately actuated. For example, a first actuator may cause the first valve portion to actuate to control the flow of fluid and a second actuator may cause the second valve portion to open and close.

In some embodiments, the fluid flow valve is controlled (e.g., by a controller) based on target flowrate and/or target pressure data, sensed fluid flowrate data, sensed fluid pressure data, and/or position data associated with the first valve portion and/or the second valve portion. In some embodiments, the second valve portion is controlled to start and stop the flow of fluid (e.g., to a process chamber). In some embodiments, the first valve portion is controlled to proportionally control the flowrate of the fluid. The second valve portion may be controlled so that fluid is provided to a process chamber at the beginning of a process recipe operation and the first valve portion may be controlled so that the fluid is provided at one or more target flowrates. The first valve portion may be controlled so that the flowrate of the fluid changes during the process recipe operation. The first valve portion may have a small cavity loss coefficient so that the response time of the first valve portion is sufficiently quick to quickly change the flowrate of fluid.

Embodiments of the present disclosure provide advantages over conventional systems described above. Particularly, some embodiments described herein provide a fluid flow valve that can isolate the flow of fluid and proportionally control the flowrate of the fluid. The fluid flow valve described herein can combine the function of two separate valves and/or flow controllers into a single valve to reduce complexity, size, and/or cost of fluid distribution systems. Further, the fluid flow valve described herein not only provides mass flow control of a fluid but can also provide pressure control of the fluid. Moreover, the fluid flow valve described herein provides a quicker response time for adjusting flowrate of fluid when compared to conventional MFCs, allowing for short duration process recipe operations to be effectively implemented. These short duration process recipe operations can improve throughput of a manufacturing system (e.g., a substrate manufacturing system). In some embodiments, a flow control valve may provide up to a 2000 Torr pressure drop and/or up to 200 slm full scale flow metering. In embodiments, an electronically tunable axisymmetric fluid path reduces proportional control cost and complexity as compared to use of MFCs, allowing proliferation in applications where MFC's are costly or unsuitable, such as heated multi-zone showerheads, or where fixed restrictors handicap a process. Discrete proportional valve control facilitates system-level optimization.

FIG. 1 depicts a system 100 that includes a processing chamber 101, a gas source 160, and a flow control apparatus (e.g., gas stick assembly 200) in accordance with embodiments of the present disclosure. The processing chamber 101 may be used for processes in which a corrosive plasma environment is provided. For example, the processing chamber 101 may be a chamber for a plasma etcher or plasma etch reactor, a plasma cleaner, and so forth. In alternative embodiments, other processing chambers may be used, which may or may not be exposed to a corrosive plasma environment. Some examples of chamber components include a chemical vapor deposition (CVD) chamber, a physical vapor deposition (PVD) chamber, an ALD chamber, an IAD chamber, an etch chamber, and other types of processing chambers. In some embodiments, processing chamber 101 may be any chamber used in an electronic device manufacturing system.

In one embodiment, the processing chamber 101 includes a chamber body 102 and a showerhead 130 that encloses an interior volume 106. The showerhead 130 may include a showerhead base and a showerhead gas distribution plate (GDP), which may have multiple gas delivery holes 132 (also referred to herein as channels) throughout the GDP. Alternatively, the showerhead 130 may be replaced by a lid and a nozzle in some embodiments, or by multiple pie shaped showerhead compartments and plasma generation units in other embodiments. The chamber body 102 may be fabricated from aluminum, stainless steel, or other suitable material such as titanium. The chamber body 102 generally includes sidewalls 108 and a bottom 110.

An outer liner 116 may be disposed adjacent the sidewalls 108 to protect the chamber body 102. The outer liner 116 may be fabricated to include one or more apertures. In one embodiment, the outer liner 116 is fabricated from aluminum oxide.

An exhaust port 126 may be defined in the chamber body 102, and may couple the interior volume 106 to a pump system 128. The pump system 128 may include one or more pumps and throttle valves utilized to evacuate and regulate the pressure of the interior volume 106 of the processing chamber 101.

The gas source 160 (e.g., a fluid source) may be coupled to the processing chamber 101 to provide process and/or cleaning gases via supply line 112 to the interior volume 106 through a showerhead 130. The flow control apparatus (e.g., gas stick 200) may be coupled to the gas source 160 and processing chamber 101. The flow control apparatus may be used to measure and control the flow of gas from the gas source 160 to interior volume 106. An exemplary flow control apparatus is described in greater detail below with respect to FIGS. 2A-2B. In some embodiments, a flow control apparatus includes a gas flow valve having a first valve portion and a second valve portion as described herein. In some embodiments, one or more gas panels 160 may be coupled to processing chamber 101 to provide gases to the interior volume 106. In such embodiments, one or more flow control systems may be coupled to each gas source 160 and processing chamber 101. In other embodiments, a single flow control apparatus may be coupled to one or more gas panels 160. In some embodiments, the flow control apparatus may comprise a flow ratio controller to control the flow of gases to the processing chamber 101 (e.g., through one or more supply lines 112), or to other processing chambers.

In some embodiments, a separate flow control apparatus is used for each gas supplied to the processing chamber. In embodiments, each flow control apparatus is or includes a gas stick assembly 200, as described and illustrated below with respect to FIGS. 2A-2B.

The showerhead 130 may be supported on the sidewall 108 of the chamber body 102. The showerhead 130 (or lid) may be opened to allow access to the interior volume 106 of the processing chamber 101, and may provide a seal for the processing chamber 101 while closed. The gas source 160 may be coupled to the processing chamber 101 to provide process and/or cleaning gases to the interior volume 106 through the showerhead 130 or lid and nozzle (e.g., through apertures of the showerhead or lid and nozzle).

In some embodiments, one or more sensor assemblies 170 may be disposed within the interior volume 106. For example, one or more sensor assemblies 170 may be located near (e.g., within 10 centimeters of) the showerhead 130. As another example, one or more sensor devices may be located near (e.g., within 10 centimeters of) the substrate 144, which may be used to monitor conditions near the reaction site.

In one embodiment, the substrate support assembly 148 includes a pedestal 152 that supports an electrostatic chuck 150. The electrostatic chuck 150 further includes a thermally conductive base and an electrostatic puck bonded to the thermally conductive base by a bond, which may be a silicone bond in one embodiment. The thermally conductive base and/or electrostatic puck of the electrostatic chuck 150 may include one or more optional embedded heating elements, embedded thermal isolators, and/or conduits to control a lateral temperature profile of the substrate support assembly 148. The electrostatic puck may further include multiple gas passages such as grooves, mesas, and other surface features that may be formed in an upper surface of the electrostatic puck. The gas passages may be fluidly coupled to a source of a heat transfer (or backside) gas such as helium via holes drilled in the electrostatic puck. In operation, the backside gas may be provided at controlled pressure into the gas passages to enhance the heat transfer between the electrostatic puck and a supported substrate 144. The electrostatic chuck 150 may include at least one clamping electrode controlled by a chucking power source.

FIG. 2A illustrates a schematic diagram of a gas stick assembly 200 in accordance with embodiments of the present disclosure. A plurality of gas stick assemblies may receive gasses from a plurality of gas supplies. For example, a processing device may include a different gas stick assembly for each type of gas that is delivered into a process chamber. As shown, gas flows from left to right through the gas stick assembly. In some embodiments, gas stick assembly 200 includes a hybrid valve 201, which may be a first component of the gas stick assembly 200. A hybrid valve may include a manual valve and a valve that can be automatically actuated (e.g., a pneumatic valve, electrical valve, etc.). Hybrid valve 201 may receive a gas from a gas source (not illustrated). The hybrid valve 201 may direct the gas to a purge valve 202 via one or more passages. The purge valve 202 may be configured to purge the gas stick assembly 200. In some embodiments, gas stick assembly 200 includes a regulator 203. The regulator 203 may receive the gas from the purge valve 202. The regulator 203 may regulate the flow of the gas through the gas stick assembly 200. In some embodiments, a filter 204 is coupled downstream of the regulator 203, and receives the flow of gas from the regulator 203. In some embodiments, an upstream valve 205 may receive the gas from the regulator 203 and direct the gas flow to a mass flow controller 206. The mass flow controller 206 may control the flow of gas through the gas stick assembly 200. In some embodiments, a downstream valve 207 receives the gas from the mass flow controller or other upstream component. The downstream valve 207 may direct the gas toward a gas destination (e.g., a processing chamber; not illustrated). In some embodiments, one or more of the hybrid valve 201, upstream valve 205, mass flow controller 206, or downstream valve 207 include a first valve portion and a second valve portion as described herein.

Figure 2B:
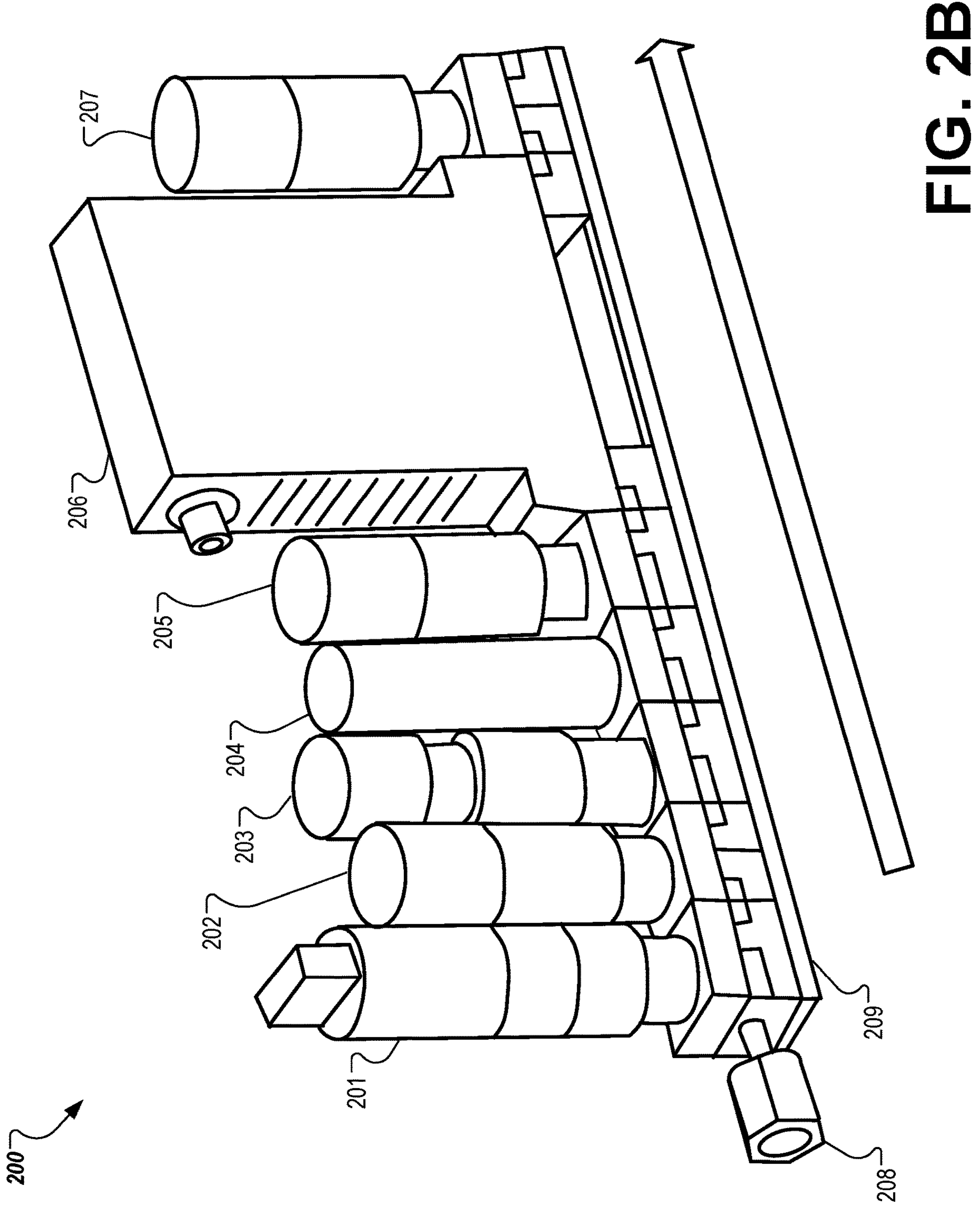
FIG. 2B is a perspective view of a gas stick assembly in accordance with embodiments of the present disclosure.

FIG. 2B illustrates a perspective view of a gas stick assembly 200 in accordance with embodiments of the present disclosure. A plurality of gas stick assemblies may receive gasses from a plurality of gas supplies. For example, a processing device may include a different gas stick assembly for each type of gas that is delivered into a process chamber. As shown, gas flows from left to right through the gas stick assembly.

In some embodiments, gas stick assembly 200 includes a base 209. Gas stick assembly 200 may receive a gas (e.g., from a gas source) via gas coupling 208. In some embodiments, gas stick assembly 200 includes hybrid valve 201, purge valve 202, regulator 203, filter 204, upstream valve 205, mass flow controller 206, and/or downstream valve 207. In some embodiments, each of hybrid valve 201, purge valve 202, regulator 203, filter 204, upstream valve 205, mass flow controller 206, and/or downstream valve 207 are coupled to a gas stick assembly base 209.

Figure 3A:
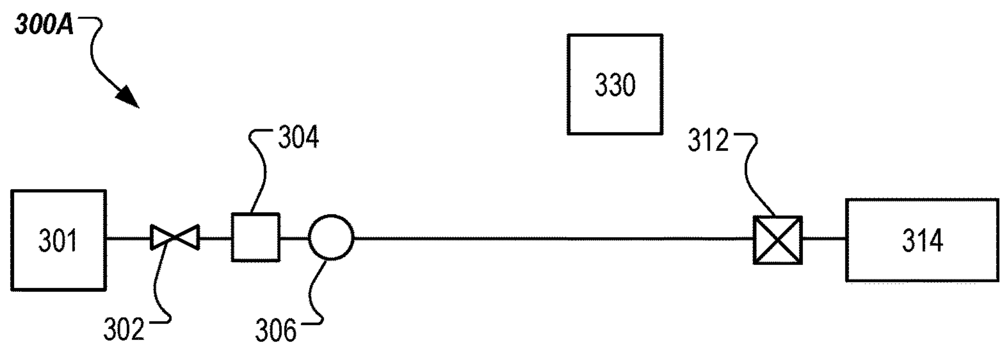
FIGS. 3A-3C are schematic diagrams of fluid distribution systems in accordance with embodiments of the present disclosure.
Figure 3B:
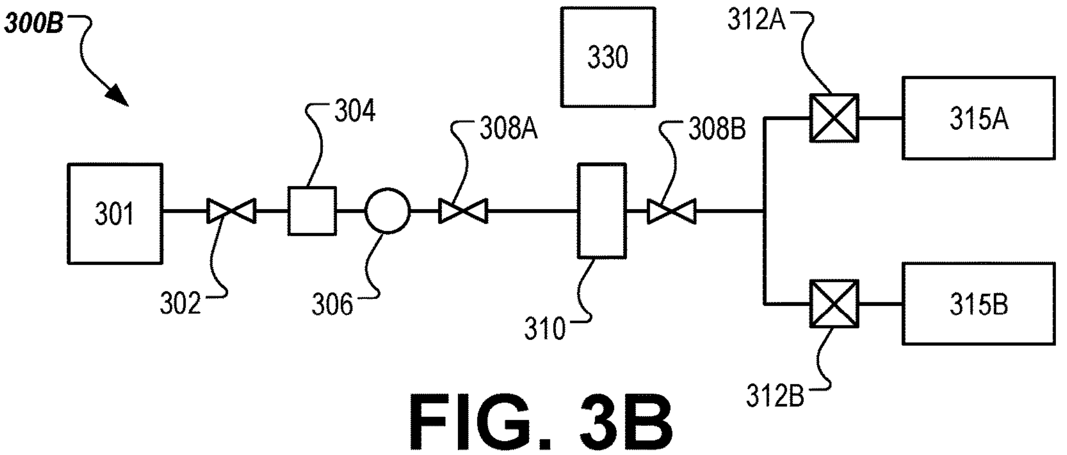
Figure 3C:
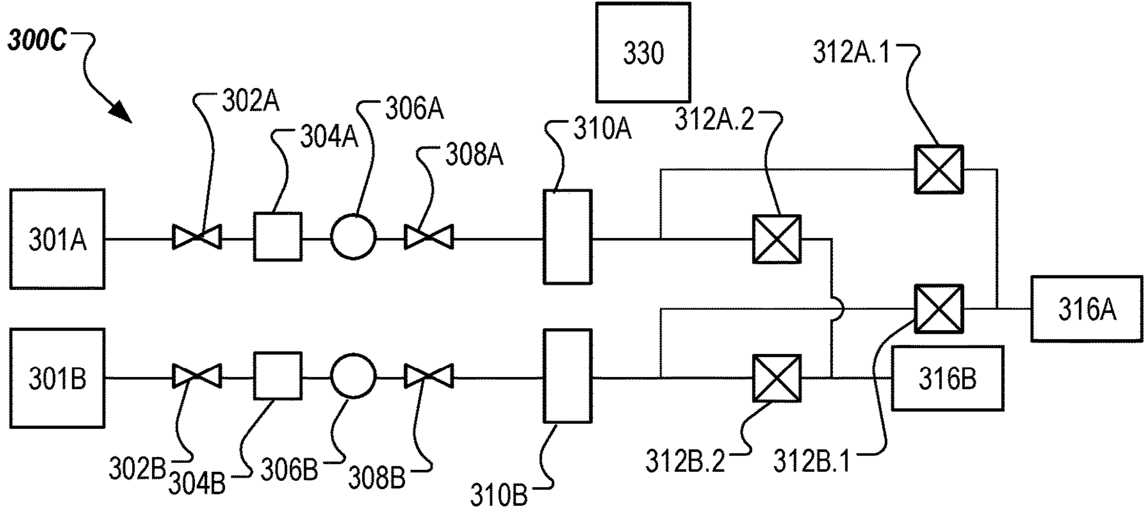

FIGS. 3A-3C are schematic diagrams of fluid distribution systems 300A-300C in accordance with embodiments of the present disclosure. In some embodiments, fluid distribution systems 300A-300C (e.g., fluid distribution systems) are to provide one or more fluids (e.g., gasses) to a process chamber for performing one or more process recipe operations. Referring to FIG. 3A, a schematic diagram of a fluid distribution system 300A is shown in accordance with embodiments of the present disclosure. In some embodiments, a fluid source 301 (e.g., a gas source) provides fluid to an isolation valve 302. In some embodiments, the isolation valve is a manually actuated valve configured to fluidly couple the remainder of the fluid distribution system 300A with the fluid source 301. In some examples, isolation valve 302 is a ball valve or a gate valve that is manually actuated (e.g., by a technician, etc.) to fluidly couple the fluid distribution system 300A with fluid source 301. Isolation valve 302 can be closed when maintenance is to be performed on the fluid distribution system 300A such as replacement of another component or disconnection of the entire fluid distribution system 300A from the fluid source 301.

In some embodiments, a regulator 304 receives the fluid from isolation valve 302. In some embodiments, regulator 304 regulates pressure and/or flow of fluid to a predetermined value. In some embodiments, regulator 304 is a passive device and may actuate responsive to the flow of fluid through fluid distribution system 300A on its own. In some embodiments, mass flow sensor 306 receives fluid from regulator 304. Flow sensor 306 may measure one or more properties of fluid through fluid distribution system 300A. In some embodiments, mass flow sensor 306 measures flow rate (e.g., mass flow rate, volumetric flow rate, etc.) of fluid through fluid distribution system 300A.

In some embodiments, fluid flow valve 312 receives the flow of fluid from mass flow sensor 306. In some embodiments, fluid flow valve 312 includes a first valve portion to proportionally control the flow of fluid and a second valve portion to permit the flow of fluid and stop the flow of fluid. In some embodiments, the controller 330 controls actuation of the fluid flow valve 312 based on a target fluid flow rate, a target fluid pressure, and/or flow rate data received from flow sensor 306. In some examples, the second valve portion of fluid flow valve 312 is opened so that fluid can flow to process chamber 314. The first valve portion of fluid flow valve 312 may be in a position to significantly choke the flow of fluid when the second valve portion is opened so that the fluid flow valve 312 provides a soft-start of fluid flow to process chamber 314. The first valve portion may be actuated to gradually increase the flow of fluid to process chamber 314. In some examples, the first valve portion is actuated gradually to decrease the flow of fluid to process chamber 314. The second valve portion may be closed once the fluid flow rate has sufficiently decreased to provide a soft-stop of fluid flow to process chamber 314. In some embodiments, regulator 304 is eliminated and the first valve portion of fluid flow valve 312 is actuated to regulate pressure of the flowing fluid.

Referring to FIG. 3B, a schematic diagram of a fluid distribution system 300B is shown in accordance with embodiments of the present disclosure. In some embodiments, fluid distribution system 300B includes a mass flow meter 310 to measure mass flow of fluid. Controller 330 may receive sensor data from mass flow meter 310 indicative of the flow of fluid through the mass flow meter 310. In some embodiments, a first isolation valve 308A and a second isolation valve 308B are configured to isolate the flow of fluid from mass flow meter 310. In some embodiments, the flow of fluid from the mass flow meter 310 is bifurcated to two different zones or multiple process chambers such as zone 315A and zone 315B. In some embodiments zones 315A and 315B are different zones of a showerhead assembly for providing fluid inside a process chamber. In some embodiments, a fluid flow valve 312A controls the flow of fluid to zone 315A and a fluid flow valve 312B controls the flow of fluid to zone 315B. In some embodiments, the flow of fluid to the different zones 315A and 315B is independently controller. For example, fluid flow to zone 315A may be at a first flow rate while fluid flow to zone 315B may be at a different second flow rate. The first valve portion and/or the second valve portion of each of fluid flow valves 312A and 312B may be independently controlled so that fluid is provided to zones 315A and 315B at different flow rates Referring to FIG. 3C, a schematic diagram of a fluid distribution system 300C is shown in accordance with embodiments of the present disclosure. In some embodiments, fluid distribution system 300C provides a first fluid from a first fluid source 301A and a second fluid from a second fluid source 301B to a first chamber 316A and a second chamber 316B. The first fluid from the first fluid source 301A flows through an isolation valve 302A, a regulator 304A, a flow sensor 306A, and another isolation valve 308A to an optional mass flow meter 310A. In some embodiments, the flow of first fluid from the optional mass flow meter 310A is bifurcated to fluid flow valve 312A.1 and fluid flow valve 312A.2 for supply to a first process chamber 316A and a second process chamber 316B respectively. Fluid flow valve 312A.1 and fluid flow valve 312A.2 may independently control the flow of first fluid from first fluid source 301A to first process chamber 316A and second process chamber 316B respectively.

Similarly, the second fluid from the second fluid source 301B flows through an isolation valve 302B, a regulator 304B, a flow sensor 306B, and another isolation valve 308B to an optional mass flow meter 310B. In some embodiments, the flow of second fluid from the optional mass flow meter 310B is bifurcated to fluid flow valve 312B.1 and fluid flow valve 312B.2 for supply to the first process chamber 316A and the second process chamber 316B respectively. Fluid flow valve 312B.1 and fluid flow valve 312B.2 may independently control the flow of second fluid from the second fluid source 301B to first process chamber 316A and second process chamber 316B respectively.

In some embodiments, controller 330 controls fluid flow valves 312A.1, 312A.2, 312B.1, and/or 312B.2 based on one or more target flow rates (e.g., associated with one or more process recipe operations) and/or sensor data such as flow sensor data. In some embodiments, controller 330 causes the fluid flow valves to be actuated independently so that different flow rates of first fluid and/or second fluid are provided to the process chamber 316A and 316B. In some embodiments, each of fluid flow valves 312A.1, 312A.2, 312B.1, and/or 312B.2 include a first valve portion and a second valve portion to proportionally control flow of fluid and isolate the fluid flow respectively.

Figure 4A:
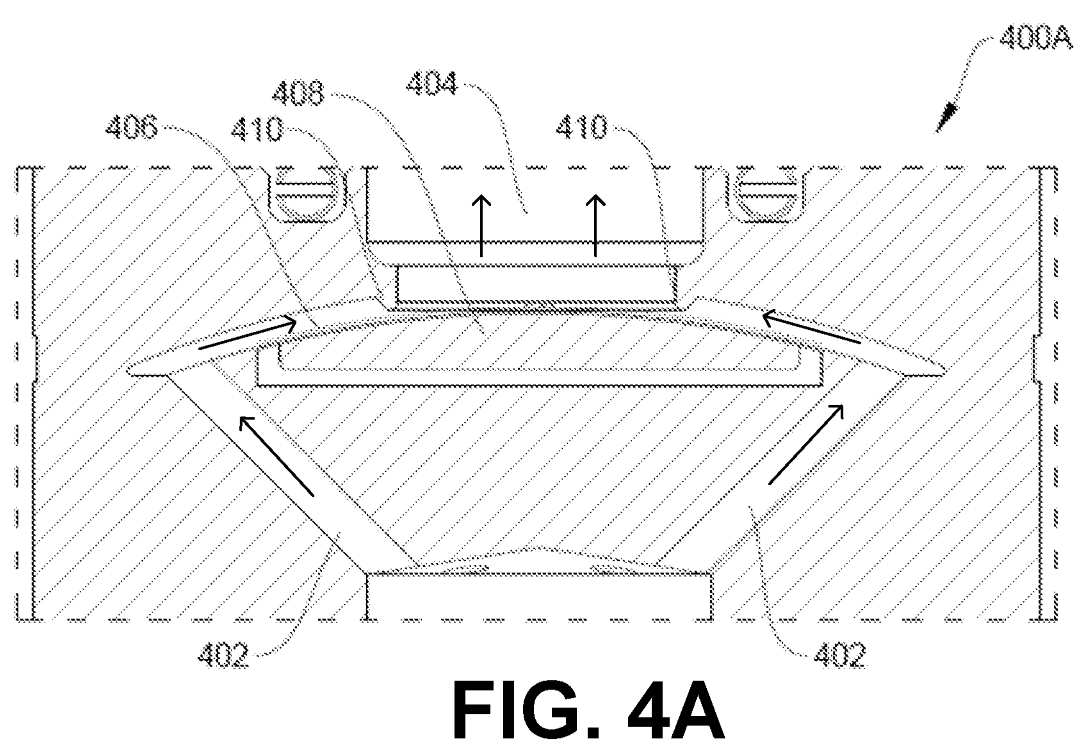
FIGS. 4A-4B are cutaway views of a fluid flow valve in accordance with embodiments of the present disclosure.
Figure 4B:
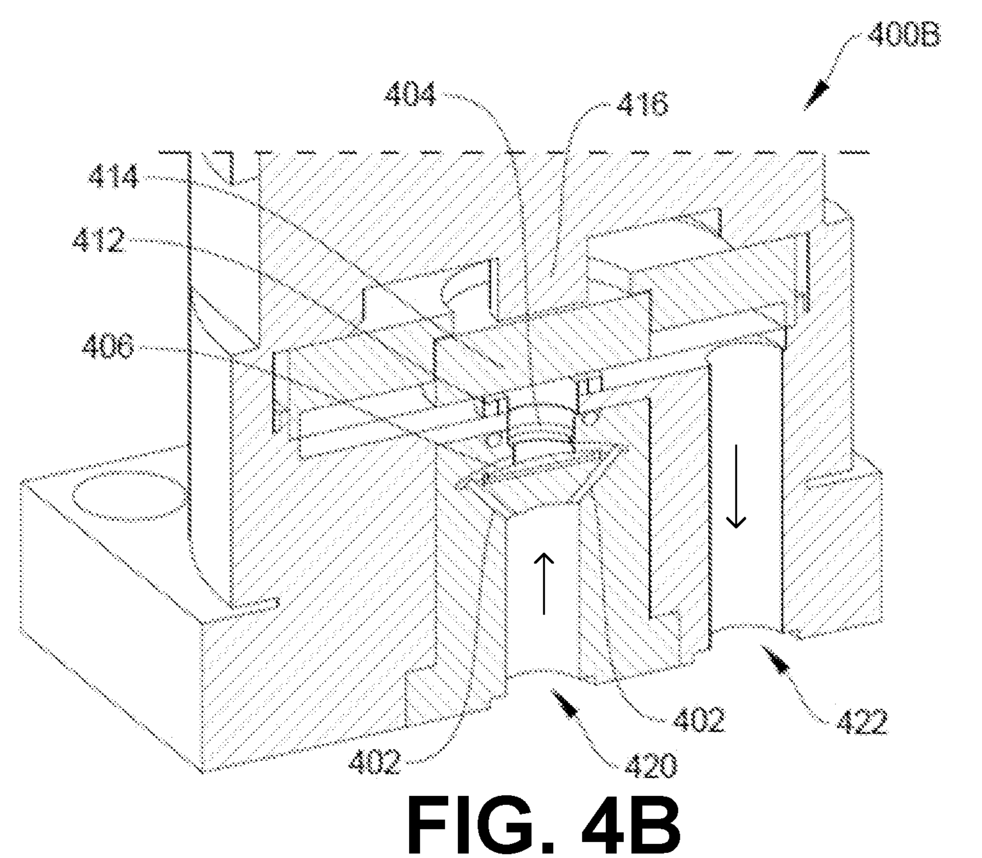

FIGS. 4A-4B are cutaway views of a fluid flow valve in accordance with embodiments of the present disclosure. FIG. 4A illustrates a side cutaway view of at least a portion of a fluid flow valve 400A in accordance with embodiments of the present disclosure. FIG. 4B illustrates a perspective cutaway view of a fluid flow valve 400B in accordance with embodiments of the present disclosure. In some embodiments, a fluid (e.g., a gas) is introduced into a fluid inlet 420 (e.g., a gas inlet). One or more passages 402 within the housing of the valve guide the fluid to a first portion of the valve configured to proportionally control the flow of fluid. In some embodiments, a diaphragm 406 is actuatable (e.g., by the piezoelectric actuator 408) to choke (e.g., control) the flow of fluid. In some embodiments, the diaphragm 406 is actuated by an actuator selected from a group consisting of a pneumatic actuator, an electronic actuator, and a piezoelectric disc. In some embodiments, the diaphragm 406 chokes the flow of fluid between a top surface of the diaphragm and one or more internal features of the housing of the valve. In some embodiments, the diaphragm 406 is coupled to a piezoelectric actuator 408. In some embodiments, piezoelectric actuator 408 is a piezoelectric disc that can actuate responsive to receiving an input signal (e.g., an electrical signal such as from a controller). In some embodiments, actuator 408 is a MEMS-based micro actuator, a solenoid actuator, a shape memory alloy actuator, etc. In some embodiments, diaphragm 406 is welded to piezoelectric actuator 408 such as by a laser welded joint. In some embodiments, diaphragm 406 is made up of a cobalt-nickel (Co—Ni) alloy. In some embodiments, an annular weir 410 surrounds an opening to an intermediate channel 404. In some embodiments, the fluid is forced to pass between the diaphragm 406 and the annular weir 410. In some embodiments, fluid flows between diaphragm 406 and annular weird 410 along an axisymmetric flow path. In some embodiments, fluid flows symmetrically between diaphragm 406 and the annular 410 about a central axis of the diaphragm 406. In some embodiments, annular weir 410 is symmetric about a central axis. In some embodiments, diaphragm 406 is symmetric about a central axis. In some embodiments, the center axis of the diaphragm 406 is coaxial with the center axis of annular weir 410.

Diaphragm 406 may be caused to flex and un-flex to proportionally control the flow of fluid through the valve between the top surface of the diaphragm 406 and the annular weir 410. In some embodiments, flexing of the diaphragm 406 tunes the cavity loss coefficient of the fluid flow passages, particularly the flow path between the diaphragm 406 and the annular weir 410. In some embodiments, tuning the cavity loss coefficient controls the flow rate of fluid. In some embodiment, tuning the cavity loss coefficient controls the pressure of fluid. In some embodiments, because actuation of diaphragm 406 is caused electronically, the cavity loss coefficient is electronically tunable. In some embodiments, flexing of the diaphragm 406 changes the effective hydraulic diameter of the fluid flow path. In some embodiments, the diaphragm 406 does not contact the annular weir 410 so that no damage to the diaphragm 406 occurs and so that no particles are created. In some embodiments, diaphragm 406 can be actuated so that less than a threshold amount of fluid leaks between the diaphragm and the annular weir 410.

In some embodiments, proportional flow throttling is made possible by applying voltage to the piezoelectric actuator 408 to modulate weir height (e.g., the distance between diaphragm 406 and annular weir 410). In some embodiments, weir height controls flow conductance. In some embodiments, increasing voltage (e.g., to the piezoelectric actuator 408) increases diaphragm deformation, and furthermore decreases weir flow cross-section, which induces lower mass flow. In some embodiments, fully discharging the piezoelectric actuator 408 returns the diaphragm 406 to the fully open position. In some embodiments, valves 400A and 400B are configured to be in full compliance to semiconductor fluid delivery performance specifications because the flow throttling mechanism is separate from flow isolation. Put simply, the combination of the diaphragm 406 and the annular weir 410 is an electronically-tunable UHP flow restrictor designed to be compatible with conventional K1S/K1H components.

Figure 4C:
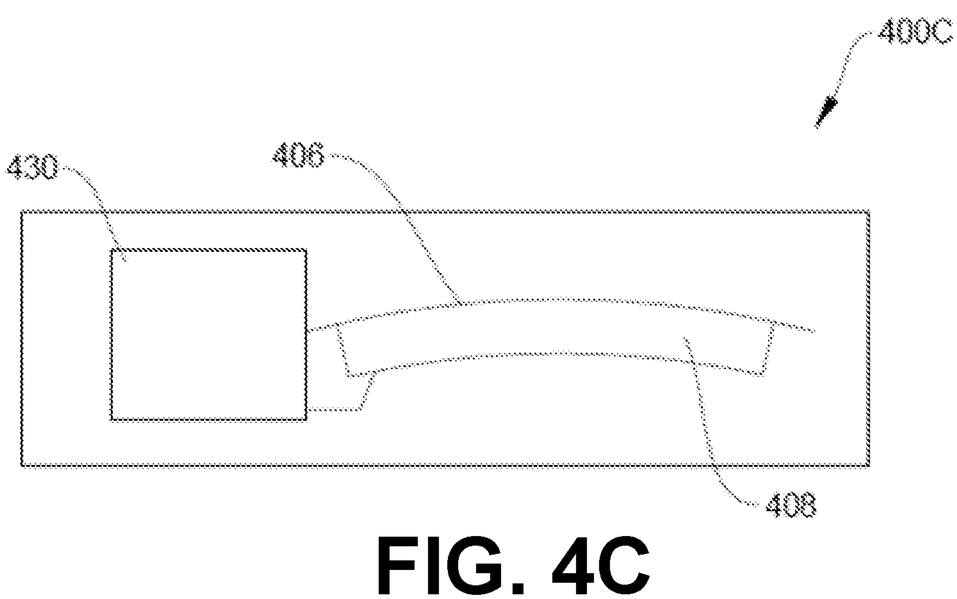
FIGS. 4C-4D illustrate deflection of a proportional control diaphragm in a fluid flow valve in accordance with embodiments of the present disclosure.
Figure 4D:
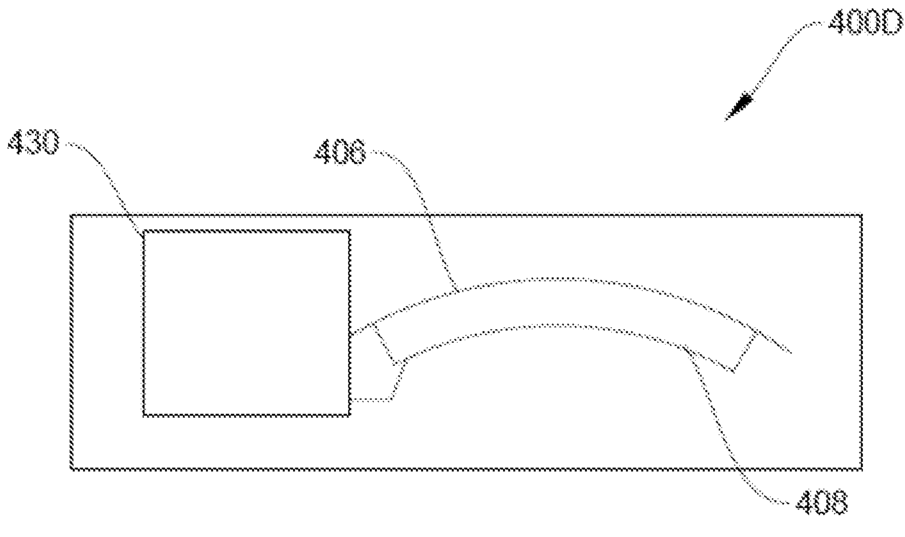

Referring to FIG. 4C, an un-flexed state 400C of diaphragm 406 is shown. In some embodiments, controller 430 causes piezoelectric actuator 408 to actuate to relax diaphragm 406. Relaxation of diaphragm 406 may cause the diaphragm 406 to un-flex or remain in a substantially un-flexed state. Referring to FIG. 4D, a flexed state 400C of diaphragm 406 is shown. In some embodiments, controller 430 causes piezoelectric actuator 408 to actuate to cause diaphragm 406 to flex upwards. In some embodiments, controller 430 sends an electrical signal to piezoelectric actuator 408 to cause the flexing and un-flexing of the diaphragm 406. Referring again to FIGS. 4A and 4B, in some embodiments, flexing of the diaphragm 406 (e.g., in the upwards direction shown) causes the choking of fluid flow between the surface of the diaphragm 406 and the annular weir 410. In some examples, the piezoelectric actuator 408 may move downwards to cause the diaphragm 406 to un-flex, opening the space between the surface of the diaphragm 406 and the annular weir 410 and allowing more fluid to pass the annular weir 410 into intermediate channel 404. In some embodiments, the diaphragm does not contact the annular weir 410 during actuation or at any other time.

Where the flow of fluid is choked, the fluid may decrease in temperature as pressure of the fluid decreases. In some embodiments, one or more heaters are disposed within a body of the valve housing to heat the flow of fluid. In some embodiments, one or more heating modules are embedded inside the valve 400A and/or 400B proximate an intermediate channel 404. The one or more heating modules may heat the fluid that was cooled during choking. In some embodiments, the heating modules may be restive heating elements in the valve body.

In some embodiments, sealing or stopping the flow of fluid is accomplished by a second portion of the fluid flow valve. In some embodiments, the fluid exits the first portion of the fluid flow valve through the intermediate channel 404 and enters the second portion of the fluid flow valve. In some embodiments, the second portion of the fluid flow valve is in series with the first portion of the fluid flow valve. In some embodiments, the second portion of the fluid flow valve is downstream of the first portion along a fluid flow path within the valve. In some embodiments, the first portion of the fluid flow valve and the second portion of the fluid flow valve are fluidly coupled by the intermediate channel 404 within the housing of the valve.

In some embodiments, a second portion of the fluid flow valve is configured to permit the flow of fluid and stop the flow of fluid. In some embodiments, an actuator 416 causes a sealing diaphragm 414 to move up and down. In some embodiments, the actuator 416 is an electronic actuator or a pneumatic actuator. When the sealing diaphragm 414 is moved down to the closed position, the sealing diaphragm 414 seats against a sealing surface 412 to stop the flow of fluid. The sealing diaphragm 414 can be moved up to an open position (e.g., by the actuator 416) to permit the flow of fluid past the sealing surface 412. In some embodiments, the fluid flows through one or more passages within the fluid flow valve and exits via fluid outlet 422. In some embodiments, fluid flowing past the sealing surface 412 is collected in an annular manifold before exiting via fluid outlet 422.

Figure 5A:
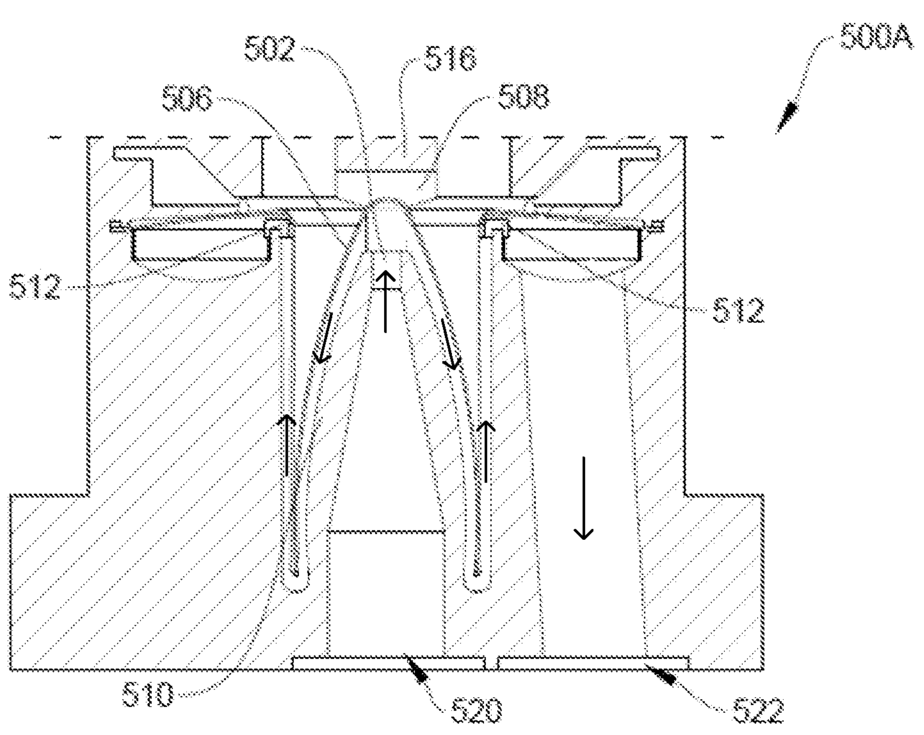
FIGS. 5A-5B are cutaway views of a fluid flow valve in accordance with embodiments of the present disclosure.
Figure 5B:
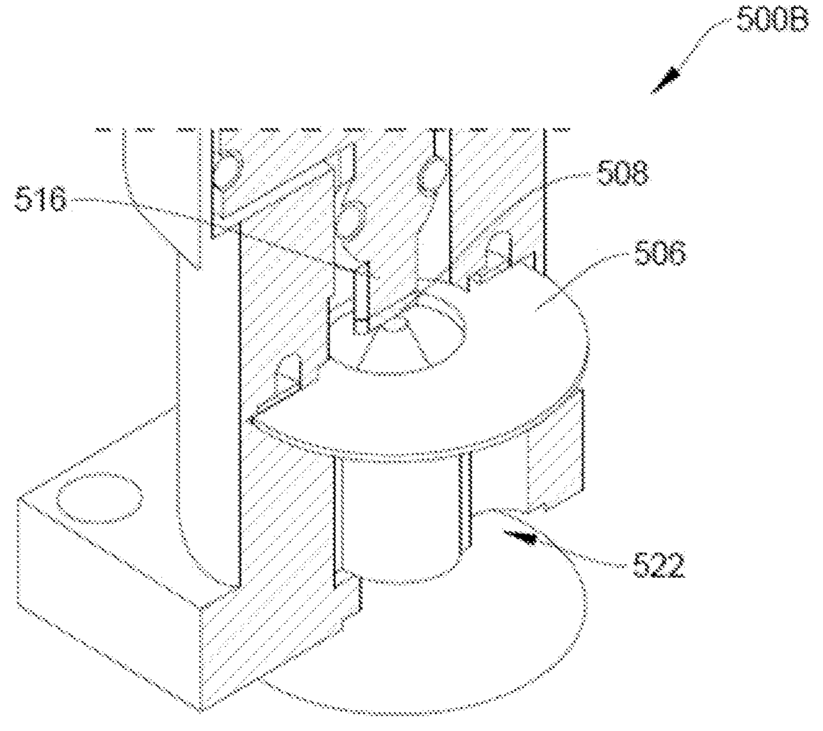

FIGS. 5A-5B are cutaway views of a fluid flow valve in accordance with embodiments of the present disclosure. FIG. 5A illustrates a side cutaway view of at least a portion of a fluid flow valve 500A in accordance with embodiments of the present disclosure. FIG. 5B illustrates a perspective cutaway view of a fluid flow valve 500B in accordance with embodiments of the present disclosure. In some embodiments, a fluid (e.g., a gas) is introduced into a fluid inlet 520 (e.g., a gas inlet). The fluid is delivered to a first valve portion through a passage 502. In some embodiments, the first valve portion is configured to proportionally control the flow of fluid. In some embodiments, passage 502 is a substantially circular opening. In some embodiments, the center of passage 502 is substantially co-axial with the center of a moveable diaphragm 506. Diaphragm 506 is actuatable (e.g., by an actuator 516 that presses and/or pulls on a button 508) to choke the flow of fluid. In some embodiments, a first portion of the diaphragm 506 chokes the flow of fluid between one or more bottom surfaces of the diaphragm and one or more interior walls 510 of the valve. In some embodiments, the diaphragm 506 includes a substantially conical portion to choke the flow of fluid. The substantially conical portion of diaphragm 506 may form the middle portion of the diaphragm 506. In some embodiments, the bottom surface of the diaphragm 506 and the interior walls 510 form one or more annular passages to flow the fluid which decreases or increases in size responsive to the movement of the diaphragm 506. In some embodiments, the interior walls 510 form a substantially conical shape corresponding to the substantially conical shape of the portion of diaphragm 506. In some embodiments, the substantially conical portion of the diaphragm 506 does not contact the interior walls 510 so that no damage to the diaphragm 506 occurs and so that no particles are created. In some embodiments, fluid flows along an axisymmetric flow path between diaphragm 506 and the interior walls 510. In some embodiments, fluid flows symmetrically between diaphragm 506 and interior walls 510 about a central axis of diaphragm 506. In some embodiments, interior walls 510 are symmetric about a central axis. In some embodiments, diaphragm 506 is symmetric about a central axis. In some embodiments, the center axis of diaphragm 506 is coaxial with the center axis of interior walls 510.

In some embodiments, actuator 516 pushes downward on button 508, which in turn pushes downward on diaphragm 506 to choke the flow of fluid. For example, as diaphragm 506 is pushed downward, the space between the bottom surface of the diaphragm 506 and the interior walls 510 becomes smaller, restricting the flow of fluid. In another example, as diaphragm 506 is lifted upward, the space between the bottom surface of the diaphragm 506 and the interior walls 510 becomes smaller, allowing an increased rate of fluid flow. In some embodiments, the movement of diaphragm 506 (e.g., movement up and down in the housing) tunes the cavity loss coefficient of the fluid flow passages, particularly the flow path between the diaphragm 506 and the interior walls 510. In some embodiments, tuning the cavity loss coefficient controls the flow rate of fluid. In some embodiments, because actuation of diaphragm 506 is caused electronically, the cavity loss coefficient is electronically tunable. In some embodiments, movement of the diaphragm 506 changes the effective hydraulic diameter of the fluid flow path. In some embodiments, diaphragm 506 is made up of a cobalt-nickel alloy. In some embodiments, fluid flows along the substantially conical portion of the diaphragm 506 (e.g., between the diaphragm 506 and the interior walls 510) and then flows toward a second portion of diaphragm 506. In some embodiments, the actuator 516 is an electronic actuator or a pneumatic actuator. In some embodiments, actuator 516 is a proportional actuator that uses a piezoelectric-regulated-air-driven button that precisely controls wetted parts gap height. Gap height may be the distance between diaphragm 506 and the interior walls 510. In some embodiments, two pneumatic pressure control valves with pulse-width-modulation are used to increase or decrease an air cylinder pressure. In some embodiments, increasing air cylinder pressure increase gap height and fluid flow. In some embodiments, decreasing air cylinder pressure decreases gap height and fluid flow. In some embodiments, button 508 springs back to a neutral position with air cylinder pressure off.

In some embodiments, a second valve portion downstream of the first valve portion includes the second portion of the diaphragm 506. In some embodiments, the second valve portion is configured to permit the flow of fluid and stop the flow of fluid. In some embodiments, the second portion of the diaphragm 506 is made up of a rim of the diaphragm 506. The rim of the diaphragm may be substantially circular. In some embodiments, the rim of the diaphragm 506 is held (e.g., by the housing of the fluid flow valve) so that the rim flexes responsive to movement of the actuator 516. In some embodiments, a portion of the rim forms a seal with a sealing surface 512 when the diaphragm 506 contacts the sealing surface 512 to stop the flow of fluid. In some embodiments, the diaphragm 506 is pushed fully downwards (e.g., by actuator 516 and/or button 508) to contact the sealing surface 512 and stop the flow of fluid. The seal formed by the sealing surface 512 and the rim of the diaphragm 506 may stop the flow of fluid. When the diaphragm 506 is moved upward from the fully down position, fluid may begin to flow past the sealing surface 512. Because the space between the bottom surface of the diaphragm 506 and the interior walls 510 is small when the rim of the diaphragm 506 initially loses contact with the sealing surface 512, the initial fluid flow rate may be small. In some embodiments, sealing surface 512 is made of polytetrafluoroethylene (PTFE), perfluoroalkoxy alkane (PFA), a metal, or a suitable polymer, etc. In some embodiments, the fluid flows through one or more passages within the fluid flow valve and exits via fluid outlet 522. In some embodiments, fluid flowing past sealing surface 512 is collected in a substantially annular manifold disposed under the rim of diaphragm 506 before flowing through fluid outlet 522.

Figure 6A:
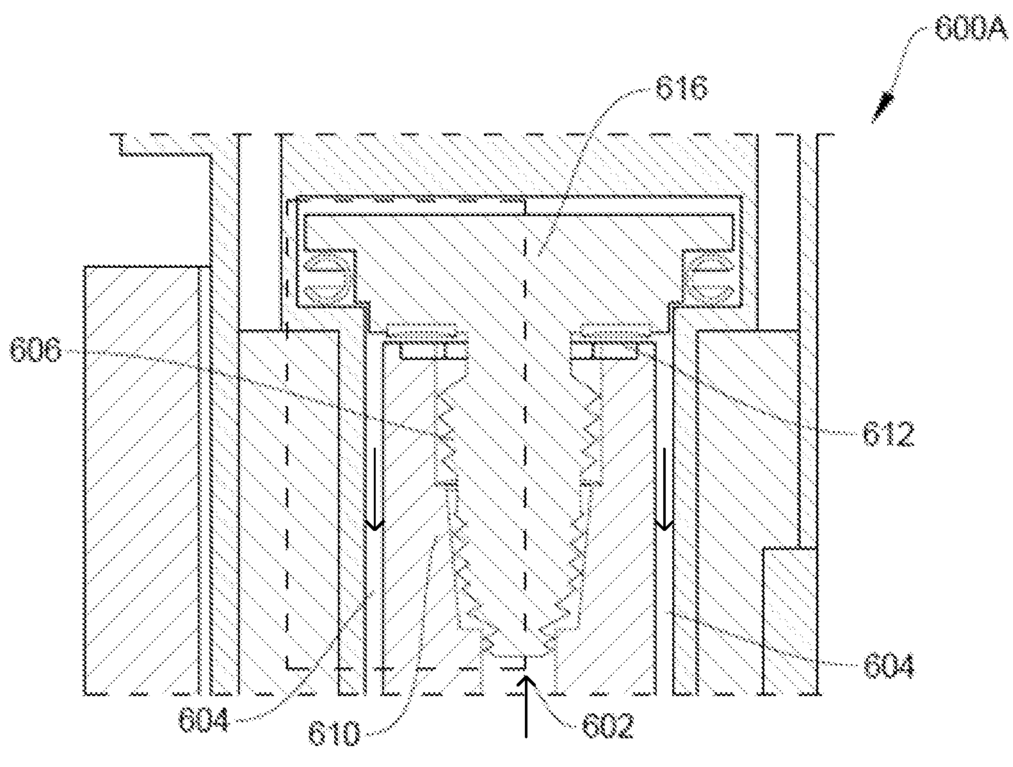
FIGS. 6A-6B are cutaway views of a fluid flow valve in accordance with embodiments of the present disclosure.
Figure 6B:
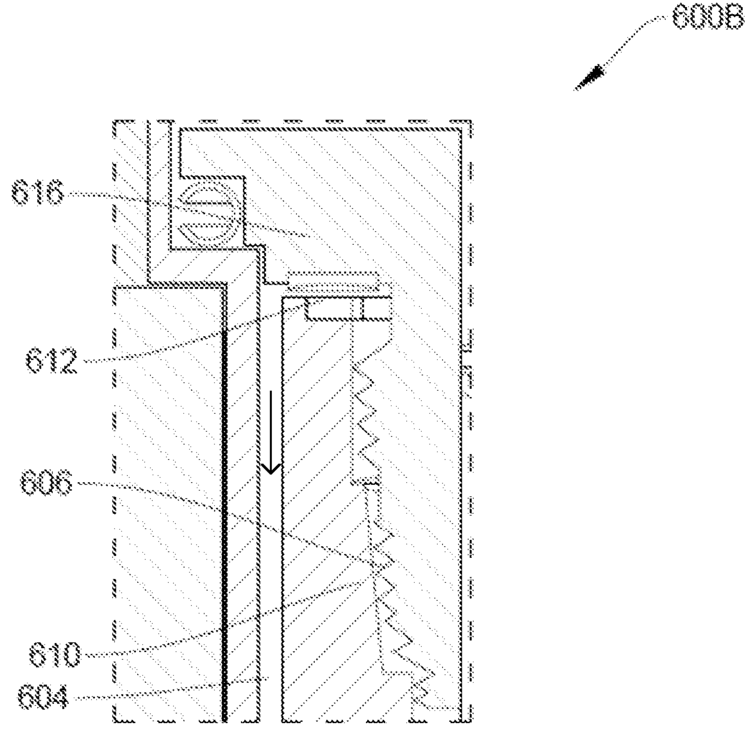

FIGS. 6A-6B are cutaway views of a fluid flow valve in accordance with embodiments of the present disclosure. FIG. 6A illustrates a side cutaway view of at least a portion of a fluid flow valve 600A in accordance with embodiments of the present disclosure. FIG. 6B illustrates a detailed cutaway view of a fluid flow valve 600B in accordance with embodiments of the present disclosure. In some embodiments, a fluid (e.g., a gas) is delivered to a first valve portion through a passage 602. In some embodiments, the first valve portion is configured to proportionally control the flow of fluid. In some embodiments, a moveable shaft 616 includes multiple adjacent cavities formed by multiple labyrinth features 606 protruding from the outer surface of the shaft 616 to choke the flow of fluid between the labyrinth features 606 and the interior walls 610. In some embodiments, fluid flows between labyrinth features 606 and interior walls 610 along an axisymmetric flow path. In some embodiment, fluid flows symmetrically between labyrinth features 606 and interior walls about a central axis of labyrinth features 606. In some embodiments, labyrinth feature 606 are symmetric about a central axis. In some embodiments, interior walls 610 are symmetric about a central axis. In some embodiments, the center axis of labyrinth features 606 is coaxial with the center axis of interior walls 610. In some embodiments, the shaft 616 is a moveable multi-stage labyrinth shaft that includes multi-stage exterior cavities (e.g., formed by the labyrinth features 606) that cause a pressure loss in the flow of fluid. In some embodiments, shaft 616 has a substantially circular axial cross-section. The flow of fluid may lose pressure and may therefore become choked as the fluid flows through the multiple stages of the labyrinth features 606.

In some embodiments, the movement of the shaft 616 up and down controls the flow of fluid. For example, as the shaft 616 moves down, the space between the labyrinth features 606 and the interior wall 610 becomes smaller, causing a greater pressure loss and choking the flow of fluid. In another example, as the shaft 616 moves up, the space between the labyrinth features 606 and interior wall 610 becomes bigger, causing less pressure loss and allowing more fluid to flow. In some embodiments, movement of shaft 616 tunes the cavity loss coefficient of the fluid flow passages between the labyrinth features 606 and the interior wall 610. In some embodiments, tuning the cavity loss coefficient controls the flow rate of fluid. In some embodiments, because actuation of shaft 616 is caused electronically (e.g., and therefore the movement of labyrinth features 606), the cavity loss coefficient is electronically tunable. In some embodiments, movement of the labyrinth features 606 (e.g., up and down in the housing as caused by the shaft 616) changes the effective hydraulic diameter of the fluid flow path. In some embodiments, the labyrinth features 606 form sinusoidal grooves in the exterior surface of shaft 616 around the circumference of shaft 616. In some embodiments, the labyrinth features 606 do not contact the interior walls 610 so that no damage to the labyrinth features 606 occurs and so that no particles are created.

In some embodiments, the flow of fluid is introduced into a second valve portion downstream of the first valve portion. In some embodiments, the second valve portion is configured to permit the flow of fluid and stop the flow of fluid. In some embodiments, the second valve portion includes a sealing surface 612 that forms a seal with a portion of shaft 616 to stop the flow of fluid when shaft 616 is moved fully down (e.g., by an actuator, etc.). When the shaft 616 is moved upward from the fully down position, fluid may begin to flow past the sealing surface 512. Because the space between the labyrinth features 606 and the interior walls 610 is small when the shaft initially loses contact with the sealing surface 612, the initial fluid flow rate may be small. In some embodiments, sealing surface 612 is made of polytetrafluoroethylene (PTFE), perfluoroalkoxy alkane (PFA), a metal, or a suitable polymer, etc. In some embodiments, fluid flows through one or more fluid outlet passages 604 to exit the valve.

Figures 7A, 7B:
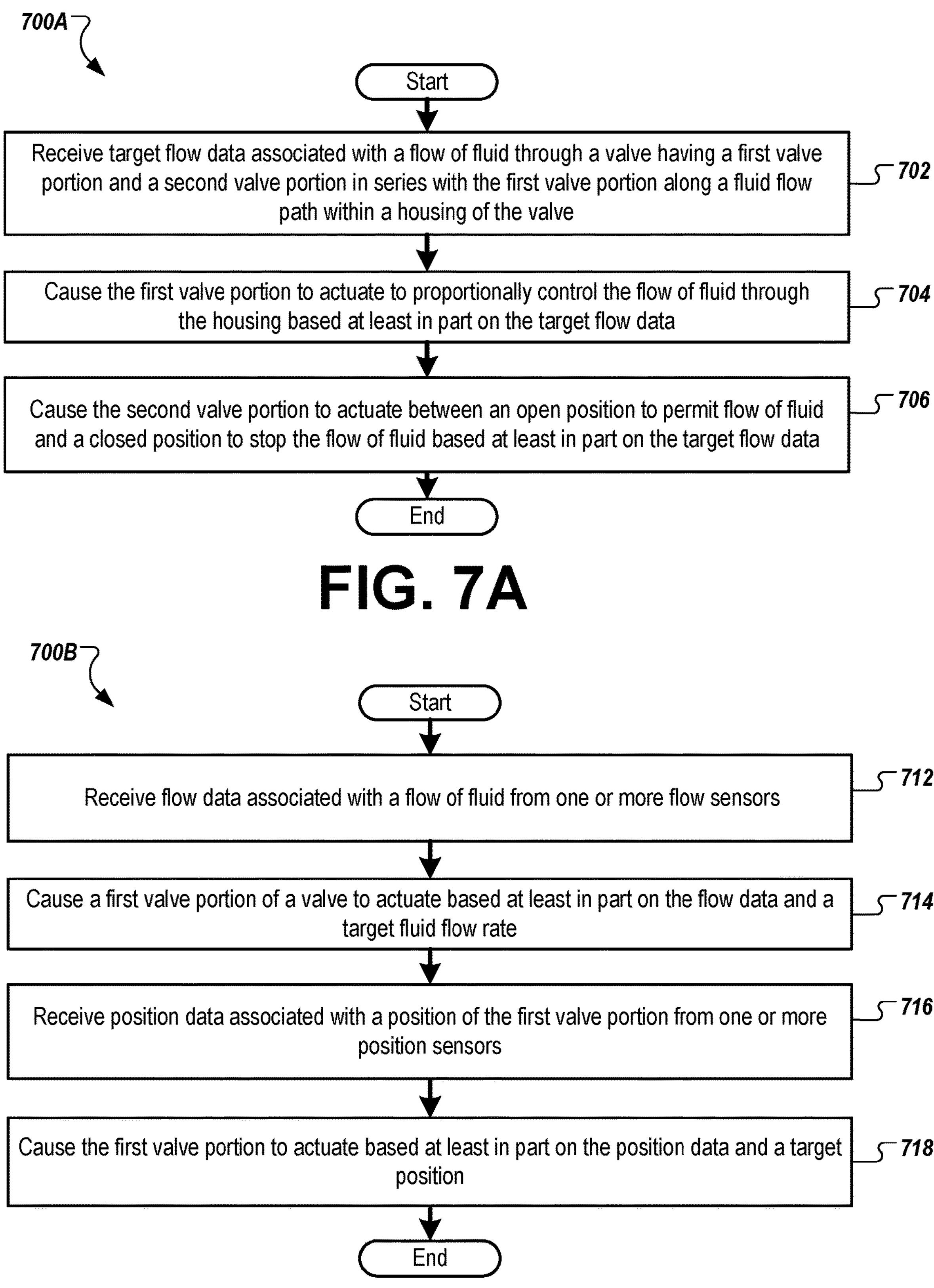
FIGS. 7A-7B are flow diagrams of methods of controlling a fluid flow valve in accordance with embodiments of the present disclosure.

FIGS. 7A-7B are flow diagrams of methods of controlling a fluid flow valve in accordance with embodiments of the present disclosure. FIG. 7A is a flow diagram of a method 700A for controlling a fluid flow valve such as fluid flow valve 400A, 400B, 500A, 500B, 600A or 600B in accordance with embodiments of the present disclosure. In some embodiments, method 700A is performed and/or caused to be performed by processing logic that includes hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiments, method 700A is performed, at least in part, by a controller a fluid flow valve assembly (e.g., controller 330, 430, etc.).

For simplicity of explanation, method 700A is depicted and described as a series of operations. However, operations in accordance with this disclosure can occur in various orders and/or concurrently and with other operations not presented and described herein. Furthermore, in some embodiments, not all illustrated operations are performed to implement method 700A in accordance with the disclosed subject matter. In addition, those skilled in the art will understand and appreciate that method 700A could alternatively be represented as a series of interrelated states via a state diagram or events.

In some embodiments, at block 702, processing logic receives target flow data associated with a flow of fluid through a valve. In some embodiments, the valve has a first valve portion and a second valve portion in series with the first valve portion along a fluid flow path within a housing of the valve. The target flow data may correspond to one or more target fluid flow rates for one or more process recipe operations (e.g., substrate process recipe operations). In some embodiments, the target flow data may indicate that a fluid is to be supplied at a first flowrate for a first duration of time and that the fluid is to be supplied at a different second flowrate for a second duration of time. In some embodiments, the target flow data may indicate that the fluid is to be supplied at a fluctuating flowrate and/or a changing flowrate over time.

In some embodiments, at block 704, processing logic causes the first valve portion to actuate to proportionally control the flow of fluid through the housing. In some embodiments, the actuation of the first valve portion is based at least in part on the target flow data. In some embodiments, the first valve portion is actuated based at least in part on flow sensor data and/or pressure sensor data associated with the flow of fluid. In some embodiments, processing logic causes a diaphragm to be moved (e.g., by an actuator) within a housing of the valve to choke the flow of fluid between a surface of the diaphragm and one or more features internal to the housing such as one or more internal passages and/or an internal weir. In some embodiments, the actuation may cause the diaphragm to flex to cause the choking of the fluid flow. In some embodiments, processing logic causes the diaphragm to flex to decrease a fluid flowrate and to un-flex to increase the fluid flowrate.

In some embodiments, at block 706, processing logic causes the second valve portion (e.g., of the fluid flow valve) to actuate between an open position to permit the flow of fluid and a closed position to stop the flow of fluid. In some embodiments, actuation of the second valve portion is based at least on the target flow data. For example, the target flow data may indicate that fluid is to be provided at a first time for a first duration. The second valve portion can be actuated to the open position at the first time for the first duration to permit the flow of fluid for the first duration. In a further example, the target flow data may indicate that the fluid is not to be provided subsequent to a second time at the end of the first duration. The second valve portion can be actuated to the closed position to stop the flow of fluid at the second time. In some embodiments, the second valve portion functions as an "on/off" valve to start and stop the flow of fluid while the first valve portion functions as a proportional control valve to control the fluid flowrate.

FIG. 7B is a flow diagram of a method 700B for controlling a fluid flow valve such as fluid flow valve 400A, 400B, 500A, 500B, 600A or 600B in accordance with embodiments of the present disclosure. In some embodiments, method 700B is performed and/or caused to be performed by processing logic that includes hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiments, method 700B is performed, at least in part, by a controller of a fluid flow valve assembly (e.g., controller 330, 430, etc.).

For simplicity of explanation, method 700B is depicted and described as a series of operations. However, operations in accordance with this disclosure can occur in various orders and/or concurrently and with other operations not presented and described herein. Furthermore, in some embodiments, not all illustrated operations are performed to implement method 700B in accordance with the disclosed subject matter. In addition, those skilled in the art will understand and appreciate that method 700B could alternatively be represented as a series of interrelated states via a state diagram or events.

In some embodiments, at block 712, processing logic receives flow data associated with a flow of fluid from one or more flow sensors. In some embodiments, the flow data corresponds to a mass flow rate and/or a volumetric flow rate of fluid flowing in a fluid distribution system.

In some embodiments, at block 714, processing logic causes a first valve portion of a valve to actuate based at least in part on the flow data (e.g., received at block 712) and a target fluid flow rate. In some embodiments, the target fluid flow rate is associated with one or more process recipe operations. In some embodiments, the first valve portion is caused to actuate so that the measured fluid flow rate (e.g., measured by the one or more flow sensors) substantially matches the target fluid flow rate.

In some embodiments, at block 716, processing logic receives position data associated with a position of the first valve portion from one or more position sensors. In some embodiments, the one or more position sensors measure the position of a diaphragm of the first valve portion.

In some embodiments, at block 718, processing logic causes the first valve portion to actuate based at least in part on the position data and a target position. In some embodiments, the target position is associated with one or more process recipe operations. In some embodiments, the first valve portion is caused to actuate so that the measured position (e.g., measured by the one or more position sensors) substantially matches the target position.

In some embodiments, the first valve portion is caused to actuate based on one or more outputs from a trained machine learning model. The trained machine learning model may be trained to output an optimized control scheme using historical actuation data for controlling the valve. In some embodiments, a machine learning model is trained with historical actuation data associated with actuation of the first valve portion and/or the second valve portion and historical flow data associated with the flow of fluid to form the trained machine learning model. In some embodiments, based on historical flow data, the trained machine learning model can predict actuation value(s) (e.g., positions of the first valve portion and/or the second valve portion) to actuate the first valve portion and/or the second valve portion to optimize the flow of fluid. In some embodiments, processing logic inputs target flowrate data and/or measured flowrate data into the trained machine learning model. The trained machine learning model may output one or more actuation values associated with a predicted fluid flow rate and/or predicted valve position to optimize the flow of fluid.

Figure 8:
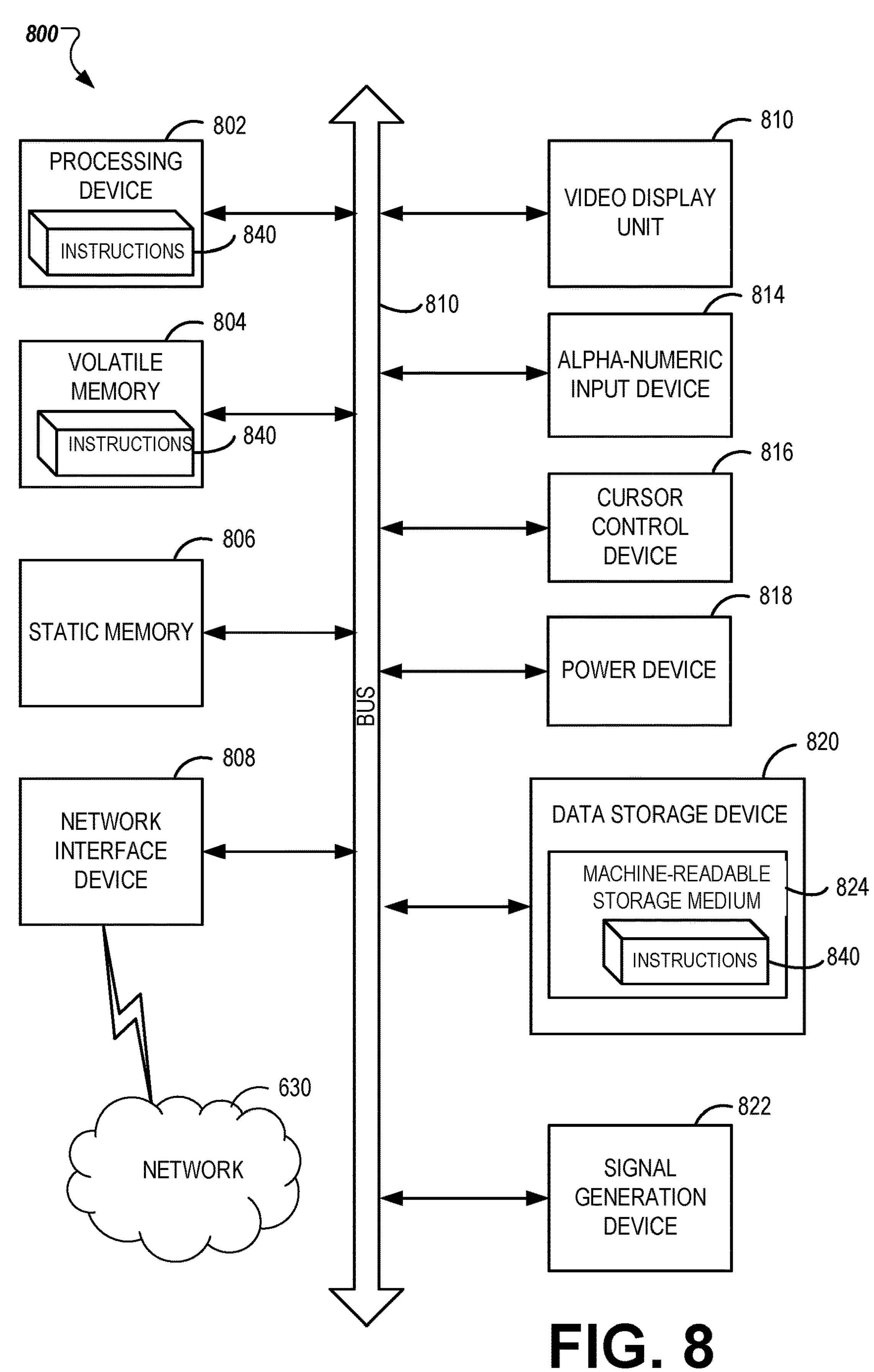
FIG. 8 is a block diagram illustrating a computer system for use in accordance with the embodiments of the present disclosure.

FIG. 8 illustrates a diagrammatic representation of a machine in the exemplary form of a computer system 800 within which a set of instructions (e.g., for causing the machine to perform any one or more of the methodologies discussed herein) may be executed. In alternative implementations, the machine may be connected (e.g., networked) to other machines in a LAN, a WAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a PDA, a cellular telephone, a web appliance, a server, a network router, switch or bridge, or any machine capable of executing a set of instructions (sequentially or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 800 may be utilized by or illustrative of any of the electronic components described herein.

The exemplary computer system 800 includes a processing device (processor) 802, a main memory 804 (e.g., ROM, flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 820, which communicate with each other via a bus 810.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 may also be one or more special-purpose processing devices such as an application specific integrated circuit (ASIC), a field programmable gate array (FPGA), a digital signal processor (DSP), network processor, or the like. The processor 802 is configured to execute instructions 840 for performing the operations discussed herein.

The computer system 800 may further include a network interface device 808. The computer system 800 also may include a video display unit 812 (e.g., a liquid crystal display (LCD), a cathode ray tube (CRT), or a touch screen), an alphanumeric input device 814 (e.g., a keyboard), a cursor control device 816 (e.g., a mouse), and a signal generation device 822 (e.g., a speaker).

Power device 818 may monitor a power level of a battery used to power the computer system 800 or one or more of its components. The power device 818 may provide one or more interfaces to provide an indication of a power level, a time window remaining prior to shutdown of computer system 800 or one or more of its components, a power consumption rate, an indicator of whether computer system is utilizing an external power source or battery power, and other power related information. In some implementations, indications related to the power device 818 may be accessible remotely (e.g., accessible to a remote back-up management module via a network connection). In some implementations, a battery utilized by the power device 818 may be an uninterruptable power supply (UPS) local to or remote from computer system 800. In such implementations, the power device 818 may provide information about a power level of the UPS.

The data storage device 820 may include a computer-readable storage medium 824 (e.g., a non-transitory computer-readable storage medium) on which is stored one or more sets of instructions 840 (e.g., software) embodying any one or more of the methodologies or functions described herein. These instructions 840 may also reside, completely or at least partially, within the main memory 804 and/or within the processor 802 during execution thereof by the computer system 800, the main memory 804, and the processor 802 also constituting computer-readable storage media. The instructions 840 may further be transmitted or received over a network 830 via the network interface device 808. While the computer-readable storage medium 824 is shown in an exemplary implementation to be a single medium, it is to be understood that the computer-readable storage medium 824 may include a single medium or multiple media (e.g., a centralized or distributed database, and/or associated caches and servers) that store the one or more sets of instructions 840.

In the foregoing description, numerous details are set forth. It will be apparent, however, to one of ordinary skill in the art having the benefit of this disclosure, that the present disclosure may be practiced without these specific details. While specific embodiments have been described herein, it should be understood that they have been presented by way of example only, and not limitation. The breadth and scope of the present application should not be limited by any of the embodiments described herein, but should be defined only in accordance with the following and later-submitted claims and their equivalents. Indeed, other various implementations of and modifications to the present disclosure, in addition to those described herein, will be apparent to those of ordinary skill in the art from the foregoing description and accompanying drawings. Thus, such other implementations and modifications are intended to fall within the scope of the present disclosure.

References were made to the accompanying drawings, which form a part of the description and in which are shown, by way of illustration, specific embodiments. Although these disclosed embodiments are described in sufficient detail to enable one skilled in the art to practice the embodiments, it is to be understood that these examples are not limiting, such that other embodiments may be used and changes may be made to the disclosed embodiments without departing from their spirit and scope. For example, the blocks of the methods shown and described herein are not necessarily performed in the order indicated in some other embodiments. Additionally, in some other embodiments, the disclosed methods may include more or fewer blocks than are described. As another example, some blocks described herein as separate blocks may be combined in some other embodiments. Conversely, what may be described herein as a single block may be implemented in multiple blocks in some other embodiments. Additionally, the conjunction "or" is intended herein in the inclusive sense where appropriate unless otherwise indicated; that is, the phrase "A, B, or C" is intended to include the possibilities of "A," "B," "C," "A and B," "B and C," "A and C," and "A, B, and C."

The words "example" or "exemplary" are used herein to mean serving as an example, instance, or illustration. Any aspect or design described herein as an "example" or "exemplary" is not necessarily to be construed as preferred or advantageous over other aspects or designs. Rather, use of the words "example" or "exemplary" is intended to present concepts in a concrete fashion. When the term "about" or "approximately" is used herein, this is intended to mean that the nominal value presented is precise within ±10%.

In addition, the articles "a" and "an" as used herein and in the appended claims should generally be construed to mean "one or more" unless specified otherwise or clear from context to be directed to a singular form. Reference throughout this specification to "an embodiment," "one embodiment," "some embodiments," or "certain embodiments" indicates that a particular feature, structure, or characteristic described in connection with the embodiment is included in at least one embodiment. Thus, the appearances of the phrase "an embodiment," "one embodiment," "some embodiments," or "certain embodiments" in various locations throughout this specification are not necessarily all referring to the same embodiment.

Some portions of the detailed description may be presented in terms of algorithms and symbolic representations of operations on data bits within a computer memory. These algorithmic descriptions and representations are the manner used by those skilled in the data processing arts to most effectively convey the substance of their work to others skilled in the art. An algorithm is herein, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "retrieving," "transmitting," "computing," "generating," "processing," "reprocessing," "adding," "subtracting," "multiplying," "dividing," "optimizing," "calibrating," "detecting," "performing," "analyzing," "determining," "enabling," "identifying," "modifying," "transforming," "applying," "causing," "storing," "comparing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission, or display devices.

Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein, along with the full scope of equivalents to which such claims are entitled.

What is claimed is:

1. A fluid flow valve, comprising:

a housing configured to receive a flow of fluid;

a first valve portion configured to proportionally control the flow of fluid along an axisymmetric flow path through the first valve portion and into an intermediate channel within the housing, wherein the first valve portion comprises a moveable diaphragm actuatable to choke the flow of fluid; and a second valve portion in series with the first valve portion along a fluid flow path formed by the intermediate channel, wherein the second valve portion is coaxial with the first valve portion and the intermediate channel, and wherein the second valve portion is configured to actuate between an open position to permit the flow of fluid and a closed position to stop the flow of fluid.

2. The fluid flow valve of claim 1, wherein the second valve portion is downstream of the first valve portion along the fluid flow path.

3. The fluid flow valve of claim 1, wherein the first valve portion is configured to tune a cavity loss coefficient to proportionally control the flow of fluid.

4. The fluid flow valve of claim 1, wherein the fluid is to flow through the housing along an axisymmetric flow path.

5. The fluid flow valve of claim 1, wherein the moveable diaphragm is actuatable to choke the flow of fluid through one or more passages between the first valve portion and the second valve portion within the housing.

6. The fluid flow valve of claim 5, wherein the second valve portion comprises at least a portion of the moveable diaphragm, and wherein the at least a portion of the moveable diaphragm contacts a sealing surface of the second valve portion to stop the flow of fluid responsive to the at least a portion of the moveable diaphragm moving to the closed position.

7. The fluid flow valve of claim 5, wherein the moveable diaphragm is configured to choke the flow of fluid through an opening formed between a surface of the moveable diaphragm and one or more internal features of the housing.

8. The fluid flow valve of claim 7, wherein the one or more internal features of the housing comprise one or more of:

an annular weir, or one or more annular passages formed between the surface of the moveable diaphragm and a fluid inlet of the housing.

9. The fluid flow valve of claim 5, further comprising:

an actuator configured to move the moveable diaphragm responsive to an input signal.

10. The fluid flow valve of claim 9, wherein the actuator is selected from a group consisting of a pneumatic actuator, an electronic actuator, a piezoelectric disc, and a MEMS-based micro actuator.

11. A fluid flow system, comprising:

a valve comprising:

a housing configured to receive a flow of fluid;

a first valve portion configured to proportionally control the flow of fluid along an axisymmetric flow path through the first valve portion and into an intermediate channel within the housing, wherein the first valve portion comprises a moveable diaphragm actuatable to choke the flow of fluid;

a second valve portion in series with the first valve portion along a fluid flow path formed by the intermediate channel, wherein the second valve portion is coaxial with the first valve portion and the intermediate channel; and a processing device configured to:

cause the first valve portion to actuate to proportionally control the flow of fluid through the first valve portion and into the intermediate channel; and cause the second valve portion to actuate between an open position to permit the flow of fluid and a closed position to stop the flow of fluid.

12. The fluid flow system of claim 11, further comprising:

one or more heaters in a body of the housing and configured to heat at least a portion of the flow of fluid.

13. The fluid flow system of claim 11, wherein the processing device is further configured to:

receive flow data associated with the flow of fluid from one or more flow sensors, wherein the processing device causes the first valve portion to actuate based at least in part on the flow data and a target fluid flow rate.

14. The fluid flow system of claim 11, wherein the processing device is further configured to:

receive position data associated with a position of the first valve portion from one or more position sensors, wherein the processing device causes the first valve portion to actuate based at least in part on the position data and a target position.

15. The fluid flow system of claim 11, wherein the processing device causes one or more of the first valve portion to acuate or the second valve portion to actuate based on one or more outputs from a trained machine learning model trained to output an optimized control scheme using historical actuation data associated with actuation of one or more of the first valve portion or the second valve portion and historical flow data associated with the flow of fluid.

16. The fluid flow system of claim 11, wherein the first valve portion comprises the movable diaphragm actuatable to choke the flow of fluid through one or more passages between the first valve portion and the second valve portion within the housing.

17. The fluid flow system of claim 16, wherein the second valve portion comprises at least a portion of the moveable diaphragm, and wherein the at least a portion of the moveable diaphragm contacts a sealing surface of the second valve portion to stop the flow of fluid responsive to the at least a portion of the moveable diaphragm moving to the closed position.

18. The fluid flow system of claim 16, wherein the moveable diaphragm is configured to choke the flow of fluid through an opening formed between a surface of the moveable diaphragm and one or more internal features of the housing comprising one or more of:

an annular weir, or one or more annular passages formed between the surface of the moveable diaphragm and a fluid inlet of the housing.

19. A method, comprising:

receiving target flow data associated with a flow of fluid through a valve having a first valve portion and a second valve portion in series with the first valve portion along a fluid flow path formed by an intermediate channel within a housing of the valve, wherein the first valve portion is configured to proportionally control the flow of fluid along an axisymmetric flow path through the first valve portion and into the intermediate channel, wherein the first valve portion comprises a moveable diaphragm actuatable to choke the flow of fluid, and wherein the second valve portion is coaxial with the first valve portion and the intermediate channel;

causing the first valve portion to actuate to proportionally control the flow of fluid through the housing based at least in part on the target flow data; and causing the second valve portion to actuate between an open position to permit the flow of fluid and a closed position to stop the flow of fluid based at least in part on the target flow data.

* * * * *